United States Patent
Sabouraud et al.

(10) Patent No.: US 6,656,318 B1
(45) Date of Patent: Dec. 2, 2003

(54) METHOD FOR CONNECTING TWO REINFORCED THERMOPLASTIC TUBES

(75) Inventors: Alain Sabouraud, Melun (FR); Alain Tournier, Nancy (FR); Michel Derycke, Valmont (FR); Gerard Joly, Creutzwald (FR)

(73) Assignee: Seva, Chalon sur Saone (FR)

( * ) Notice: Subject to any disclaimer, the term of this patent is extended or adjusted under 35 U.S.C. 154(b) by 0 days.

(21) Appl. No.: 09/600,596

(22) PCT Filed: Nov. 22, 1999

(86) PCT No.: PCT/FR99/02870

§ 371 (c)(1),
(2), (4) Date: Oct. 4, 2000

(87) PCT Pub. No.: WO00/32978

PCT Pub. Date: Jun. 8, 2000

(30) Foreign Application Priority Data

Nov. 27, 1998 (FR) .............................. 98 14987

(51) Int. Cl.[7] .......................... B29C 65/20; B32B 31/04
(52) U.S. Cl. ................ 156/304.2; 156/304.3; 156/158; 156/86
(58) Field of Search ............... 156/155, 304.2, 156/304.6, 304.3, 158, 86; 285/21.1

(56) References Cited

U.S. PATENT DOCUMENTS

| 3,865,662 A | 2/1975 | Segal |
|---|---|---|
| 4,257,630 A | 3/1981 | Bartell et al. |
| 4,709,948 A | 12/1987 | Archer et al. |
| 5,364,130 A | 11/1994 | Thalmann |

FOREIGN PATENT DOCUMENTS

| DE | 2049 565 | 5/1972 | | |
|---|---|---|---|---|
| FR | 2 389 483 | 12/1978 | | |
| GB | 829179 | 2/1960 | | |
| GB | 2 280 145 A | 1/1995 | | |
| GB | 2 319 576 A | 5/1998 | | |
| GB | WO 98/26919 | * | 6/1998 | ........... B29C/63/34 |

OTHER PUBLICATIONS

"Database WPI", Section Ch, Week 9112, Derwent Publications Ltd., London, GB; An 91–085152 XP002112970 & JP 62 113998 A (Kyushu Sekisui Ind.), May 25, 1987 abstract.

* cited by examiner

Primary Examiner—Steven D. Maki
Assistant Examiner—Todd J. Kilkenny
(74) Attorney, Agent, or Firm—Wenderoth, Lind & Ponack, L.L.P.

(57) ABSTRACT

The invention concerns a method of joining two reinforced thermoplastic material tubes having the same diameter. Ends of the two tubes are first butt welded along a peripheral weld. After forming the weld, a reinforced thermoplastic material outer jacket is fitted over most of the length of the peripheral weld, extending on either side of the weld over end sections of the two tubes. The outer jacket is heated and pressed radially until the outer jacket and the end sections of the two tubes interpenetrate.

22 Claims, 3 Drawing Sheets

METHOD FOR CONNECTING TWO REINFORCED THERMOPLASTIC TUBES

BACKGROUND OF THE INVENTION

The present invention concerns a method of joining two reinforced thermoplastic material tubes having the same diameter.

Pipes for transporting fluids in cities are made from tubes of small diameter, on the order of 80 to 200 mm. The tubes are often made from reinforced thermoplastic material.

To assure the continuity of the pipes, two ends of such reinforced thermoplastic material tubes must often be joined in a sealed manner at an installation site.

It is well known in the art to use metal connectors to connect two tube ends in order to guarantee that the resulting pipe has the same resistance to external stresses in the area of the joint and in the main part of the tubes.

These metal connectors are weak in terms of axial loads and do not assure effective locking of the joint. A tube end often separates from the connector when the pipe is pressurized.

SUMMARY OF THE INVENTION

The object of the invention is to provide a method of joining two reinforced thermoplastic material tubes which is simple to perform and guarantees satisfactory strength of the resulting pipe in the region of the connection as well as effective locking, and prevents any separation in response to axial loads.

To this end, the invention consists in a method of joining two reinforced thermoplastic material tubes having the same diameter. Ends of the two tubes are first butt welded along a peripheral weld and, after forming the weld, a reinforced thermoplastic material outer jacket is fitted over most of the length of the peripheral weld. The reinforced outer jacket extends on either side of the weld over end sections of the two tubes. The outer jacket is heated and pressed radially until the outer jacket and the end sections of the two tubes interpenetrate.

Particular embodiments of the method have one or more of the following features:

- radial pressure is applied to the outer jacket until reinforcing structures reinforcing the two tubes and the outer jacket come into contact upon interpenetration of the outer jacket and the end sections of the two tubes;
- the outer jacket comprises a tubular cylinder defining a closed contour enveloping the end sections of the tubes;
- the outer jacket comprises a longitudinally split cylinder enveloping the end sections of the tubes;
- the circumferential length of the outer jacket is such that the outer jacket defines a closed contour around the two tubes after interpenetration of the jacket and the end sections of the two tubes;
- the outer jacket includes composite threads including continuous glass filaments and continuous organic thermoplastic material filaments, which filaments are adapted to form a web;
- the organic thermoplastic material is polyethylene;
- the composite threads of continuous glass filaments and continuous organic thermoplastic material filaments cross—cross;
- the composite threads are wound helically and define angles of substantially +55° or −55° with the axis of the outer jacket;
- the composite threads define angles of substantially 0° and 90° with the axis of the outer jacket;
- the continuous glass filaments and the continuous organic thermoplastic material filaments are woven;
- the axial length of the outer jacket is in the range from 0.5 times to 3 times the diameter of the tubes to be joined;
- the ends of the tubes are butt welded without filler material, in particular by mirror welding; and
- a protective sleeve is fitted over the entire surface of the outer jacket after it is applied to the tubes.

BRIEF DESCRIPTION OF THE DRAWINGS

The invention will be better understood after reading the following description which is given by way of example only and with reference to the drawings, in which.

DESCRIPTION OF THE PREFERRED EMBODIMENTS

Figure 1:
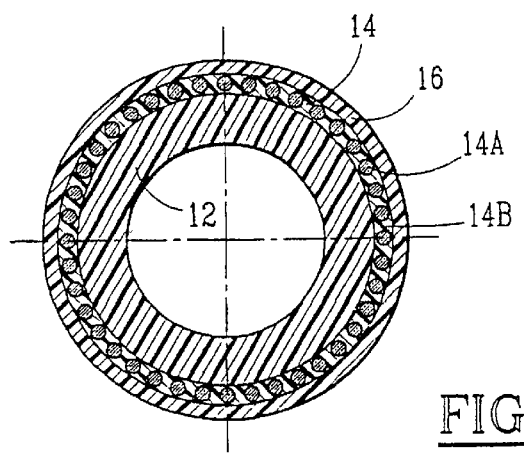
FIG. 1 is a cross-sectional view of a reinforced thermoplastic material tube.

A tube for conveying fluids shown in FIG. 1 has an inside diameter of 180 mm, for example. The tube is a composite tube made from a reinforced thermoplastic material.

The tube has an extruded high-density polyethylene inner layer 12. The inner layer is 8 mm thick, for example. The inner layer 12 is covered by a reinforcing layer 14 formed of continuous filaments of glass and continuous filaments of a thermoplastic organic material, such as high-density polyethylene, which can be of the same grade as that constituting the inner layer 12.

To form the reinforcing layer 14, the continuous glass filaments and the continuous organic thermoplastic material filaments are combined to form continuous composite threads in which the two types of filaments are intimately joined. Such composite threads are made by the method described in document EP-0.367.661, WO-98/01751 or EP-0.599.695. The composite threads are wound helically in a cross—cross fashion. Relative to the longitudinal axis of the tube, the threads cross at an angle of ±55°, or at angles of 0° and 90° relative to a generatrix of the tube. The composite threads wound in this way are bonded by heating to a temperature higher than the melting point of the organic thermoplastic material filaments to form a continuous layer whose void ratio is advantageously less than 0.5% by volume, and preferably less than 0.2%.

The continuous glass filaments 14A are then embedded in the organic thermoplastic material 14B. The criss-cross continuous glass filaments reinforce the material constituting the tube. The total thickness of the reinforcing layer 14 is 2 mm, for example.

An outside face of the tube is delimited by an outer layer 16 of high-density polyethylene which can be of the same grade as the polyethylene constituting the inner layer 12. The outer layer 16 is co-extruded. It is thin, for example 2 mm thick.

Figure 2:
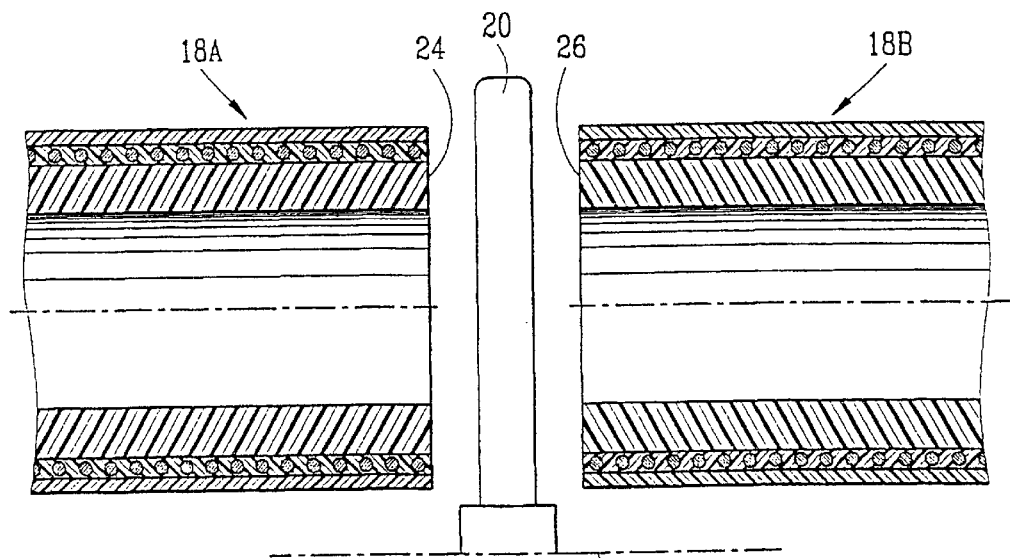
FIGS. 2 and 3 are diagrammatic views in longitudinal section of two tubes to be joined, showing the first steps of the joining method of the invention.

FIG. 2 shows two sections of tubes 18A, 18B of the type shown in FIG. 1. These sections of tubes are to be joined using the method of the invention.

To this end, ends of the two sections of tubes 18A, 18B are disposed face-to-face on an axis common to the two sections of tubes.

The ends of the tubes are first butt welded without filler material. The welding is advantageously performed by a mirror welding process.

To this end, and as shown in FIG. 2, a rotating disc 20 with its axis 22 parallel to the axis of the two sections of tubes is disposed between annular end faces 24, 26 of the two sections of tubes. The faces 24, 26 are held in contact with opposite faces of the disc 20, which is rotated about the axis 22. This heats the faces of the two sections of tubes to a sufficient temperature to soften them to a condition close to melting.

The disc 20 is then removed and the faces of the two sections of tubes 18A, 18B are moved towards each other and pressed axially against each other. They are then cooled.

Figure 3:
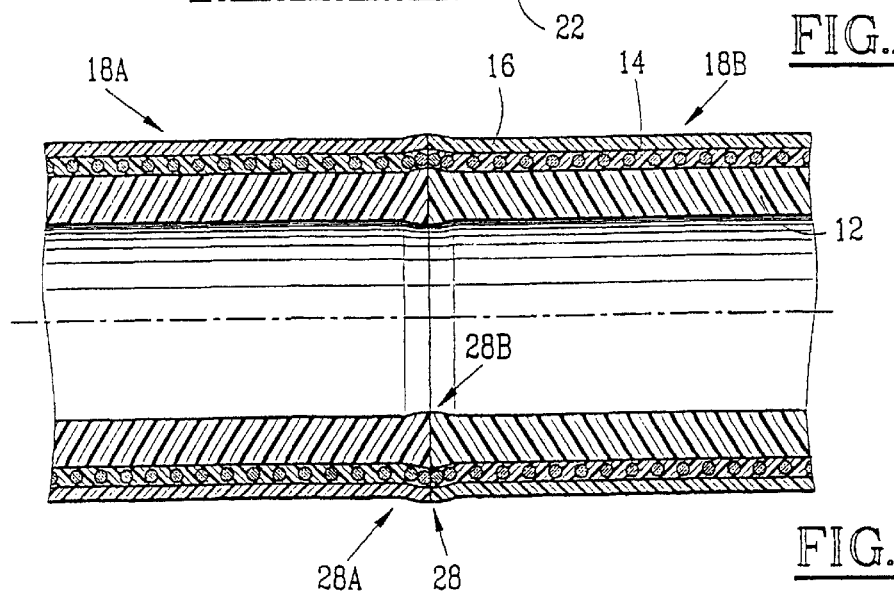

As shown in FIG. 3, the inner layers 12, intermediate layers 14 and outer layers 16 of the two sections of tubes 18A, 18B are respectively welded to each other along a peripheral weld 28. In the area of the weld 28, an external bead 28A and an internal bead 28B are formed, resulting from the pressing together of the two softened faces of the two sections of tubes.

Figure 4:
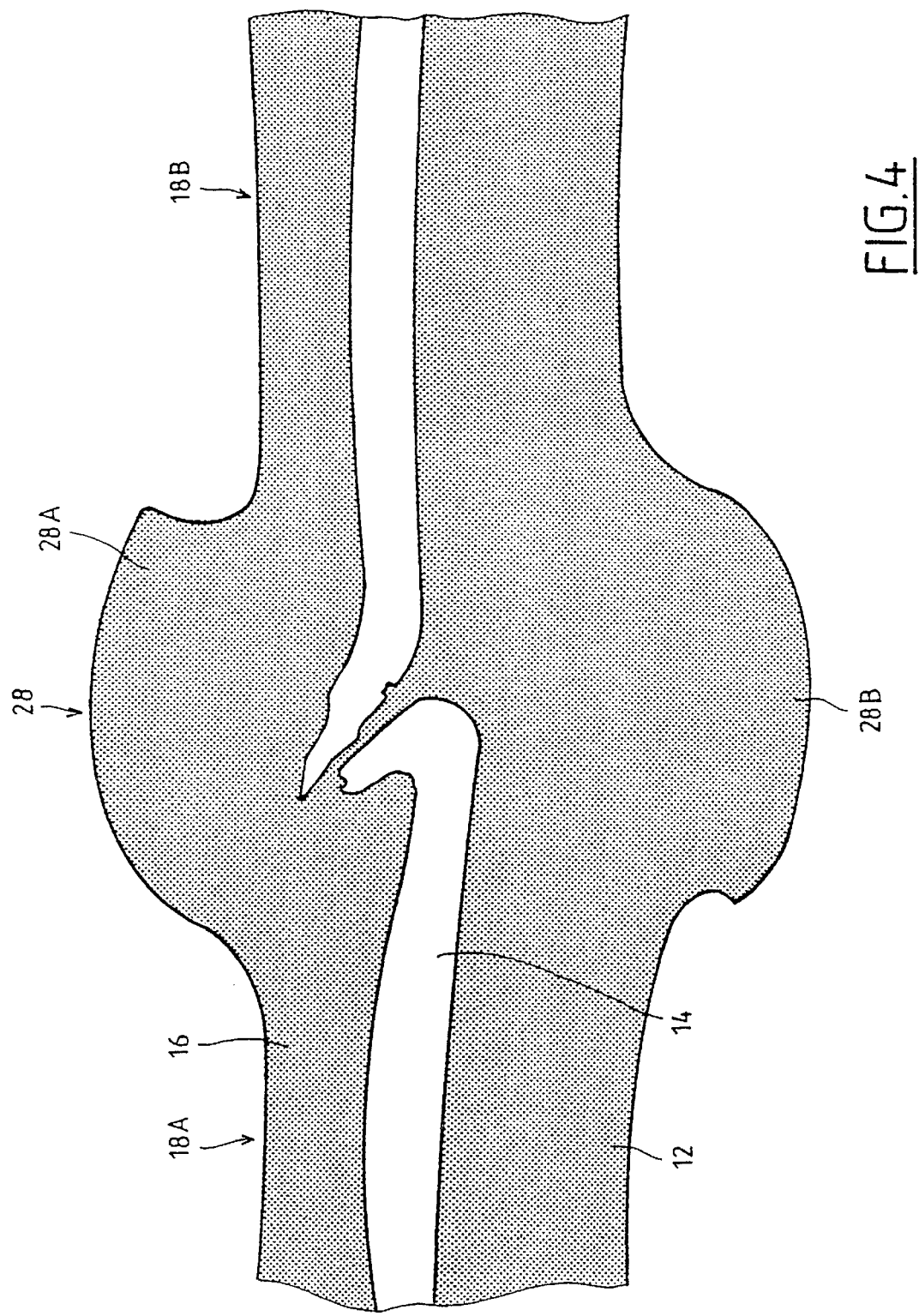
FIG. 4 is a diagrammatic view in longitudinal section and to a larger scale of the welded region of the two tubes.

FIG. 4 is a diagrammatic representation of the weld obtained in this way.

Examination of the weld shows that the joint between the two sections of tubes is sealed and that the glass filaments contained in the reinforcing layer 14 remain embedded in the high-density polyethylene without creating any passage for liquid. In particular, ends of the reinforcing layer 14 are curved and overlap. However, they do not project as far as the thin outer layer 16 in the region of the weld 28.

Figure 5:
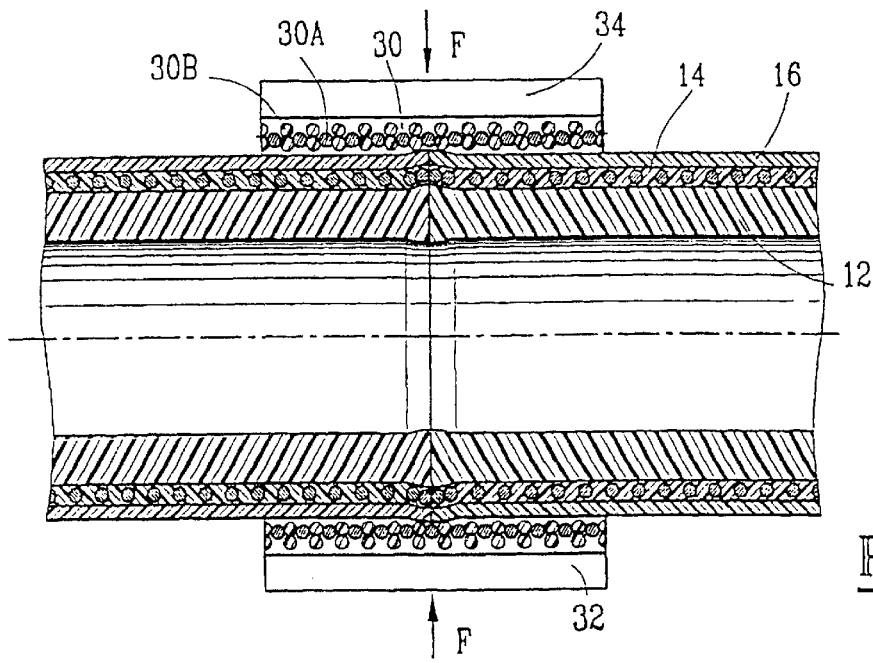
FIGS. 5, 6, and 7 are diagrammatic views in longitudinal section of two welded tubes showing the final steps of the method of the invention.

After making the weld 28, and as shown in FIG. 5, a reinforcing outer jacket 30 made from a reinforced thermoplastic material is fitted around the weld 28. The axial length of the reinforcing outer jacket is sufficient for the outer jacket to project on either side of the weld 28 over end sections of the assembled two sections of tubes 18A, 18B.

The outer jacket 30 is formed of a longitudinally split cylinder enveloping two end sections of the two sections of tubes. The axial length of the reinforcing outer jacket is in the range from 0.5 times to 3 times the outside diameter of the two sections of tubes to be joined.

The reinforcing outer jacket 30 advantageously initially includes composite threads formed of continuous glass filaments 30A and continuous filaments 30B of an organic thermoplastic material such as high-density polyethylene. The composite threads are assembled to form a web.

In a first embodiment of the method, the composite threads in the reinforcing outer jacket 30 comprising the continuous glass filaments and the continuous organic thermoplastic material filaments are wound helically in a cross—cross fashion. The threads cross each other at an angle in the range from 50° to 55° relative to the axis of the reinforcing outer jacket, for example. Alternatively, the composite threads advantageously cross at angles of 0° and 90° relative to the axis of the reinforcing outer jacket. This assures enhanced axial reinforcement after the reinforcing outer jacket is fitted around the end sections of the two sections of tubes. The structure of the outer jacket 30 then essentially corresponds to that of the reinforcing layer 14 of the two sections of tubes 18A, 18B before heating.

As an alternative, the threads are woven.

The composite threads are advantageously each in the form of 800 glass filaments and 800 polyethylene filaments intimately mixed with each other. TWINTEX composite threads sold by VETROTEX contain 60% glass filaments and 40% polyethylene filaments.

To apply the jacket 30, two heating half-shells 32, 34 are applied to an outside surface of the jacket. The two heating half-shells are designed to heat the outer jacket 30 and to press it radially onto the weld 28 and onto the joined end sections of the two sections of tubes 18A, 18B. A pressure of 1 bar provides the best results.

Figure 6:
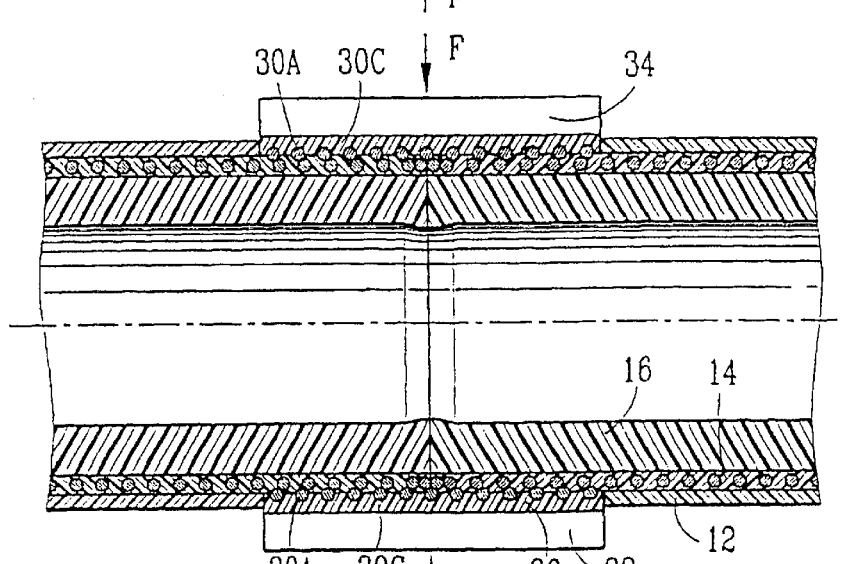

The heating half-shells 32, 34 compress the outer jacket radially, in the direction of the arrows F, and simultaneously heat it to a temperature above the melting point of the organic thermoplastics material forming the filaments 30B. The action of the half-shells is maintained until the outer jacket 30 and the end sections of the two sections of tubes 18A, 18B interpenetrate, as shown in FIG. 6. The radial clamping and heating are performed until the filaments 30B melt and the glass filaments 30A and 14A, forming reinforcing filaments of the outer jacket 30 and the outer layer 16, come into contact.

After melting, the filaments 30B form a coherent material 30C in which the glass filaments 30A are coated thereby or buried therein.

When the heating shells are removed, and after cooling, the glass filaments 30A of the joined two sections of tubes 18A, 18B are continuous in the region of the joint, thereby reinforcing the pipe axially and circumferentially.

The circumferential length of the outer jacket 30 is advantageously chosen so that, after it interpenetrates with the end sections of the two sections of tubes, facing longitudinal ends of the outer jacket are adjacent or partly overlap, with the result that the outer jacket 30 is circumferentially continuous.

Figure 7:
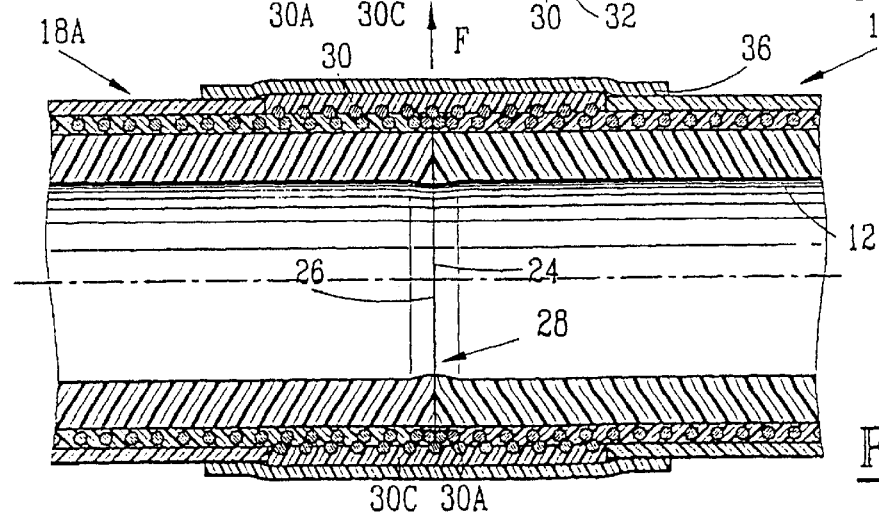

A protective sleeve 36 (see FIG. 7) is fitted over the entire surface of the outer jacket 30 to protect the region of the joint, and in particular the outside surface of the jacket 30, from physical and chemical attack by soil. The protective sleeve 36 is advantageously made from a heat-shrink material such as high-density polyethylene, which can be of the same grade as that of the inner layer 12.

The outer jacket 30 is advantageously fitted and pressed radially onto the welded end sections of the two sections of tubes before the weld 28 cools.

The outer jacket 30 can be fitted at room temperature and heated at the same time as it is pressed radially onto the joined region of the two sections of tubes.

Alternatively, the outer jacket 30 is heated away from the two sections of tubes and is fitted around these sections at a temperature enabling it to be shrunk radially when pressed by the two half-shells.

In a different embodiment of the invention, the outer jacket is a tube with a closed contour before it is fitted around the end sections.

With a method as described above, the joint between the two sections of tubes clearly has a strength similar to that of a main part of the tubes because the glass filaments providing the reinforcement are continuous in the section of the joint.

What is claimed is:

1. A method of joining together two reinforced thermoplastic tubes, comprising:

butt welding an end of a first thermoplastic tube having reinforcing structure therein to an end of a second thermoplastic tube having reinforcing structure therein to provide a welded portion of said first and second thermoplastic tubes having said reinforcing structure therein;

fitting a thermoplastic jacket having reinforcing structure therein over said welded portion; and heating and radially pressing said thermoplastic jacket until said thermoplastic jacket and said welded portion interpenetrate with one another such that said reinforcing structure of said thermoplastic jacket comes into contact with said reinforcing structure of said welded portion and said reinforcing structure of end sections of said first and second thermoplastic tubes adjacent to said welded portion, wherein said reinforcing structure of said thermoplastic jacket includes continuous composite threads of combined continuous glass filaments and continuous organic thermoplastic filaments.

2. The method according to claim 1, wherein said first thermoplastic tube has a diameter that is equal to a diameter of said second thermoplastic tube.

3. The method according to claim 2, wherein said thermoplastic jacket comprises a cylindrical tubular thermoplastic jacket defining a closed contour such that fitting said thermoplastic jacket over said welded portion comprises enveloping said welded portion with said cylindrical tubular thermoplastic jacket.

4. The method according to claim 2, wherein said thermoplastic jacket comprises a longitudinally split cylindrical thermoplastic jacket such that fitting said thermoplastic jacket over said welded portion comprises enveloping said welded portion with said longitudinally split cylindrical thermoplastic jacket.

5. The method according to claim 4, wherein heating and radially pressing said thermoplastic jacket until said thermoplastic jacket and said welded portion interpenetrate with one another includes heating and radially pressing said longitudinally split thermoplastic jacket until said longitudinally split thermoplastic jacket closes to define a closed contour around said welded portion.

6. The method according to claim 2, wherein said reinforcing structure of said thermoplastic jacket comprises a web formed from continuous composite threads of combined continuous glass filaments and continuous organic thermoplastic filaments, whereby heating and radially pressing said thermoplastic jacket until said thermoplastic jacket and said welded portion interpenetrate with one another comprises heating and radially pressing said thermoplastic jacket until said thermoplastic jacket and said welded portion interpenetrate with one another such that said web of said thermoplastic jacket comes into contact with said reinforcing structure of said welded portion and said reinforcing structure of said end sections of said first and second thermoplastic tubes adjacent to said welded portion.

7. The method according to claim 6, wherein said continuous organic thermoplastic filaments comprise continuous polyethylene filaments such that said web is formed from continuous composite threads of combined continuous glass filaments and continuous polyethylene filaments.

8. The method according to claim 7, wherein said web formed from continuous composite threads of combined continuous glass filaments and continuous polyethylene filaments comprises a web formed from criss-crossed composite threads of continuous glass filaments and continuous polyethylene filaments.

9. The method according to claim 6, wherein said web formed from continuous composite threads of combined continuous glass filaments and continuous organic thermoplastic filaments comprises a web formed from criss-crossed composite threads of continuous glass filaments and continuous organic thermoplastic filaments.

10. The method according to claim 9, wherein said web formed from criss-crossed composite threads of continuous glass filaments and continuous organic thermoplastic filaments comprises a web formed from said composite threads being helically wound and defining angles of substantially +55° or −55° with respect to an axis of said thermoplastic jacket.

11. The method according to claim 9, wherein said web formed from criss-crossed composite threads of continuous glass filaments and continuous organic thermoplastic filaments comprises a web formed from said composite threads defining angles of substantially 0° and 90° with respect to an axis of said thermoplastic jacket.

12. The method according to claim 6, wherein said web formed from continuous composite threads of combined continuous glass filaments and continuous organic thermoplastic filaments comprises a web formed from continuous composite threads of combined woven continuous glass filaments and woven continuous organic thermoplastic filaments.

13. The method according to claim 2, wherein an axial length of said thermoplastic jacket is from about 0.5 times to 3.0 times the diameter of said first and second thermoplastic tubes.

14. The method according to claim 2, wherein butt welding an end of a first thermoplastic tube to an end of a second thermoplastic tube comprises butt welding said end of said first thermoplastic tube to said end of said second thermoplastic tube without using filler material.

15. The method according to claim 14, wherein butt welding said end of said first thermoplastic tube to said end of said second thermoplastic tube without using filler material comprises mirror welding said end of said first thermoplastic tube to said end of said second thermoplastic tube.

16. The method according to claim 2, further comprising surrounding said thermoplastic jacket with a protective sleeve after heating and radially pressing said thermoplastic jacket.

17. The method according to claim 2, wherein said welded portion corresponds to a weld and portions of said first and second thermoplastic tubes that extend from said weld and have therein said reinforcing structure, whereby fitting a thermoplastic jacket having reinforcing structure therein over said welded portion comprises fitting said thermoplastic jacket over said weld and over said portions of said first and second thermoplastic tubes that extend from said weld, and heating and radially pressing said thermoplastic jacket until said thermoplastic jacket and said welded portion interpenetrate with one another includes heating and radially pressing said thermoplastic jacket until said thermoplastic jacket and said portions of said first and second thermoplastic tubes that extend from said weld interpenetrate with one another such that said reinforcing structure of said thermoplastic jacket comes into contact with said reinforcing structure of said portions of said first and second thermoplastic tubes that extend from said weld.

18. The method according to claim 17, wherein said thermoplastic jacket comprises a cylindrical tubular thermoplastic jacket defining a closed contour such that fitting said thermoplastic jacket over said weld and over said portions of said first and second thermoplastic tubes that extend from said weld comprises enveloping said weld and said portions of said first and second thermoplastic tubes that extend from said weld with said cylindrical tubular thermoplastic jacket.

19. The method according to claim 17, wherein said thermoplastic jacket comprises a longitudinally split cylindrical thermoplastic jacket such that fitting said thermoplastic jacket over said weld and said portions of said first and second thermoplastic tubes that extend from said weld comprises enveloping said weld and said portions of said first and second thermoplastic tubes that extend from said weld with said longitudinally split cylindrical thermoplastic jacket, and heating and radially pressing said thermoplastic jacket until said thermoplastic jacket and said portions of said first and second thermoplastic tubes interpenetrate with one another includes heating and radially pressing said longitudinally split thermoplastic jacket until said longitudinally split thermoplastic jacket closes to define a closed contour around said weld and said portions of said first and second thermoplastic tubes that extend from said weld.

20. The method according to claim 17, wherein butt welding an end of said first thermoplastic tube to an end of said second thermoplastic tube comprises mirror welding said end of said first thermoplastic tube to said end of said second thermoplastic tube.

21. The method according to claim 17, further comprising surrounding said thermoplastic jacket with a protective sleeve after heating and radially pressing said thermoplastic jacket.

22. The method according to claim 17, wherein said reinforcing structure of said thermoplastic jacket comprises a web formed from continuous composite threads of combined continuous glass filaments and continuous organic thermoplastic filaments, whereby heating and radially pressing said thermoplastic jacket until said thermoplastic jacket and said portions of said first and second thermoplastic tubes interpenetrate with one another comprises heating and radially pressing said thermoplastic jacket until said thermoplastic jacket and said portions of said first and second thermoplastic tubes interpenetrate with one another such that said web of said thermoplastic jacket comes into contact with said reinforcing structure of said portions of said first and second thermoplastic tubes that extend from said weld.

* * * * *